United States Patent [19]

Rognon

[11] Patent Number: 4,998,510
[45] Date of Patent: Mar. 12, 1991

[54] COOLING SYSTEM FOR AIR COOLED INTERNAL COMBUSTION ENGINES

[76] Inventor: Armand Rognon, 18 rue des Chateau Auffrique, Coucy le, France, 02380

[21] Appl. No.: 359,608

[22] Filed: Jun. 1, 1989

[30] Foreign Application Priority Data

Jun. 2, 1988 [FR] France ............................ 88 07347

[51] Int. Cl.$^5$ .............................................. F01P 1/02
[52] U.S. Cl. .................. 123/41.7; 123/41.57; 123/41.65; 60/321
[58] Field of Search ............... 123/41.11, 41.31, 41.44, 123/41.49, 41.52, 41.57, 41.65, 41.69, 41.7, 41.66; 60/320, 321; 165/51

[56] References Cited

U.S. PATENT DOCUMENTS

| | | | |
|---|---|---|---|
| 2,046,252 | 6/1936 | Davis | 165/51 |
| 2,777,287 | 1/1957 | Tweedale | 123/41.11 |
| 3,164,140 | 1/1965 | Nuttall, Jr. | 123/41.65 |
| 3,357,413 | 12/1967 | Quinton | 123/41.57 |
| 4,133,654 | 1/1979 | Hill et al. | 60/321 |
| 4,709,666 | 12/1987 | Merz | 123/41.47 |

FOREIGN PATENT DOCUMENTS

| | | |
|---|---|---|
| 1908240 | 8/1970 | Fed. Rep. of Germany . |
| 2337479 | 2/1975 | Fed. Rep. of Germany . |
| 1396142 | 3/1965 | France . |
| 2215840 | 8/1974 | France . |
| 1241205 | 8/1971 | United Kingdom .................. 60/321 |
| 1554540 | 10/1979 | United Kingdom . |

*Primary Examiner*—Noah P. Kamen
*Attorney, Agent, or Firm*—Lowe, Price, LeBlanc, Becker & Shur

[57] ABSTRACT

A cooling system is provided for an air-cooled internal combustion engine, and includes at least a first fan for causing air to flow along a path directly surrounding individual air-cooled cylinders of the engine and a radiator disposed in the air-flow path. A first liquid flows around the exhaust manifold, for cooling the same, and through the radiator which is cooled by the air-flow that has passed around the air-cooled engine cylinders.

10 Claims, 2 Drawing Sheets

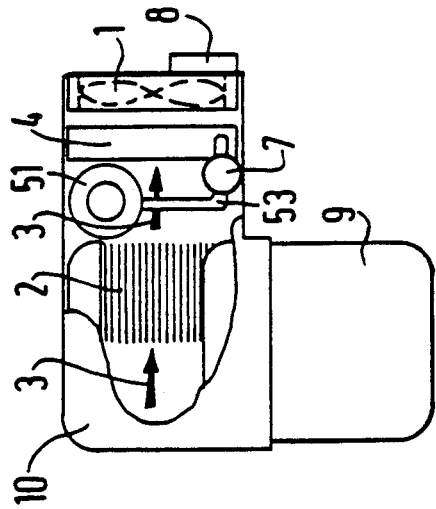
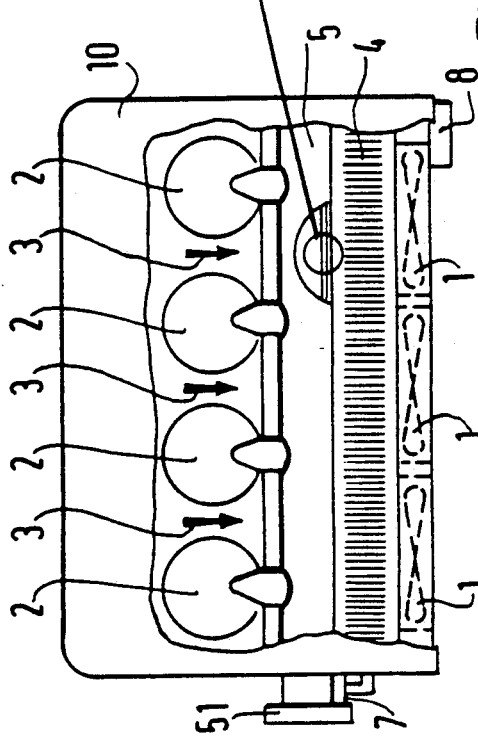
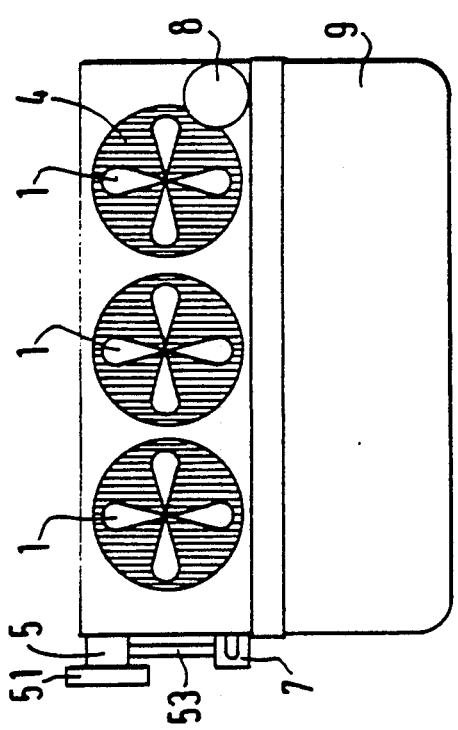
FIG.1
FIG.2
FIG.3

COOLING SYSTEM FOR AIR COOLED INTERNAL COMBUSTION ENGINES

FIELD OF THE INVENTION

The present invention relates to a cooling system for air-cooled internal combustion engines comprising at least first means for causing air to flow along a path directly surrounding the cylinders of said engine.

Background of the Prior Art

The invention applies particularly to diesel engines whose cylinders are air cooled. For such engines, the cylinders being directly surrounded by the air path, no water flow for cooling them is provided thereabout.

In such engines, the gas leaves the cylinders at a relatively high temperature. The result is that the temperature of the walls of the exhaust manifold, as well as that of the gases leaving this exhaust manifold, are too high to make the use of such engines possible, without the danger of explosion, in a combustive atmosphere, such for example as oil drilling platforms or else in premises where inflammable powdery materials or explosives or else certain chemical products are manufactured.

The purpose of the present invention is to overcome this drawback by providing an engine whose cylinders are air-cooled, and which can be used without danger in a combustive atmosphere.

SUMMARY OF THE INVENTION

Accordingly, there is provided an engine of the above-defined type, characterized by the fact that it comprises a radiator disposed in a path, which a first liquid flows for cooling the exhaust manifold of the engine.

In the engine of the invention, the exhaust manifold is cooled by a liquid, for example water, itself flowing in a radiator so as to exchange with the outside the heat with which it is charged when cooling the exhaust manifold. However, in the engine according to a preferred embodiment of this invention it is not necessary to provide an additional fan for cooling this radiator, for it is cooled by the cooling air of the cylinders.

Advantageously, said first means are disposed downstream of the cylinders in said air flow path to draw in said air, and said radiator is disposed between said cylinders and first means for causing said air to flow.

The air movement thus created by reduced pressure, is smoother and more efficient than when it is created by an overpressure.

Advantageously again, in another aspect of the invention second means are provided for causing said air to flow, disposed upstream of the cylinders in said path for blowing said air.

The temperature of the exhaust gases is further lowered, because the action of the second means reinforces that of the first means.

Advantageously again, in other aspects of the invention said first cooling liquid flows in a jacket surrounding said exhaust manifold, and about said first jacket a second jacket is provided containing a second cooling liquid.

BRIEF DESCRIPTION OF THE DRAWINGS

The present invention will be better understood from the following description of the preferred embodiment of the invention and one of its variants, with reference to the accompanying drawings in which:

FIG. 1 is a front view of the engine of the invention;

FIG. 2 is a top view, with parts cut away, of the engine of FIG. 1;

FIG. 3 is a left hand view, with parts cut away, of the engine of FIG. 1;

DESCRIPTION OF THE PREFERRED EMBODIMENTS

Figure 5:
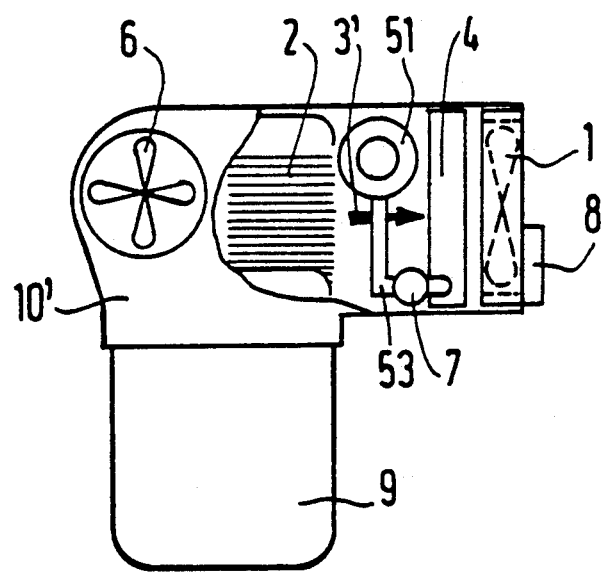
FIG. 5 is a left hand view, with parts cut away, of the engine of FIG. 4.

Referring to FIGS. 1, 2 and 3, an internal combustion engine comprises an engine block 9, over which is mounted here a row of cylinders 2.

An exhaust manifold 5 is disposed parallel to the line of cylinders 2 for collecting the gases leaving them. The exhaust manifold 5 is intended to be connected, by means of a flange 51, to an exhaust system not shown because known.

The exhaust manifold 5 is surrounded by a first jacket 52 inside which a first cooling liquid flows, such for example as water. For this, jacket 52 is connected to a radiator 4 by two pipes, one of which 53 is visible in the drawings. To pipe 53 is connected a water pump 7, driven in a way not shown because known, so as to cause the water to flow between radiator 4 and jacket 52 of the exhaust manifold 5.

The first jacket 52 is here surrounded by a second jacket 54 containing a second inert cooling liquid, such for example as inert fluorine.

Radiator 4 is here of the horizontal water circulation type, and it has a substantially rectangular shape, of a width substantially equal to the height of cylinders 2, and of a length substantially equal to that of the row of cylinders 2. It is disposed so that the length is substantially parallel to the row of cylinders 2 and it faces this row.

Fans 1, here three in number, of a diameter substantially equal to the height of the cylinders, and aligned along a straight line substantially parallel to the row of cylinders 2, are disposed so as to face radiator 4, on the side thereof opposite the side where the row of cylinders 2 is situated.

The fans 1 are driven, in a way not shown because known, by means of belts connected to a hydraulic motor 8, itself driven by the internal combustion engine in a way not shown because known.

A fairing 10, in which air intakes are provided, covers the elements which have just been described so as to ensure optimum air flow.

The engine which has just been described is cooled in the following way. The hydraulic motor 8 drives fans 1 so that they cause air to flow along a path shown in the drawings by arrows 3, which path is oriented from cylinders 2 towards fans 1. It may then be said that fans 1, disposed downstream of cylinders 2 in path 3, draw in the cooling air. It may also be said that the path 3 of the cooling air directly surrounds each of cylinders 2 for no water flow is provided thereabout.

Since radiator 4 is disposed between the row of cylinders 2 and fans 1, and so in the path 3, it is also cooled by the cooling air drawn in by fans 1.

The water cooled in radiator 4 through the cooling air flows through jacket 52 under the action of the water pump 7 so as to cool the exhaust manifold 5.

The arrangement and operation which have just been described make it possible, in an engine whose cylinders are air-cooled, to lower the temperature of the walls of the exhaust manifold, as well as the temperature of the gases leaving the latter.

Figure 4:
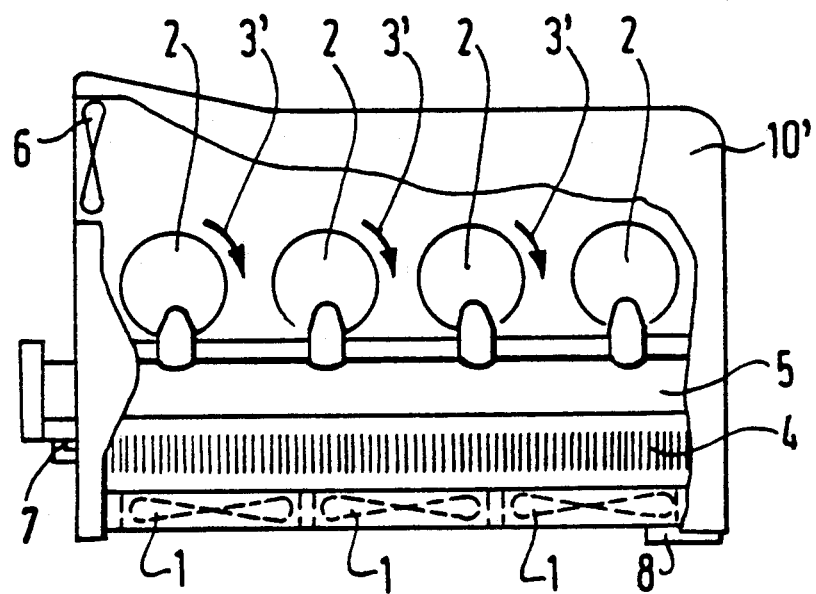
FIG. 4 is a top view, with parts cut away, of a variant of the engine of FIG. 1.

FIGS. 4 and 5 show a variant, in which a further fan 6 is provided, disposed upstream of the row of cylinders 2 in path 3, for blowing the cooling air.

In FIGS. 4 and 5, fan 6 is disposed in a wall of fairing 10' substantially perpendicular to the output shaft of the engine, which makes it possible to drive it, in a way not shown because known, by means of a belt connected to the output shaft.

Path 3' of the cooling air is substantially the same as path 3, and the cooling efficiency is further increased, because the action of the blowing fan 6 reinforces the action of the suction fans 1.

Naturally, the present invention is not limited to the description which has just been made. In particular, the number of fans 1 may be less than or greater than three, depending on the number and arrangement of the cylinders. Similarly, it is within the scope of a man skilled in the art to modify the methods of driving the fans and causing the water to flow between the radiator and the exhaust manifold, and the direction of cooling water flow through radiator 4.

Similarly, it is possible to replace the second inert cooling liquid in the second jacket 54 by a liquid flowing under the action of a pump.

What is claimed is:

1. A cooling system for an air-cooled internal combustion engine, comprising:
   first means for causing air to flow along a path directly surrounding individual cylinders of said engine;
   a first cooling liquid jacket formed around an exhaust manifold of the engine for enabling a flow of a first cooling liquid around said exhaust manifold to cool a flow of exhaust gas flowing from said engine through said exhaust manifold; and
   a radiator communicating with said first cooling liquid jacket to receive a flow of a first cooling liquid therefrom; said radiator being disposed to be cooled by said air flow that has passed said individual cylinders of said engine.

2. The engine cooling system as claimed in claim 1, wherein:
   said first means are disposed downstream of the cylinders in said air flow path for drawing in said air, and said radiator is disposed between said cylinders and said first means for causing said air to flow.

3. The engine cooling system as claimed in claim 2, wherein:
   second means for further enabling said air to flow, disposed upstream of the cylinders in said air flow path.

4. The engine cooling system as claimed in claim 3, wherein:
   said second means for enabling said cooling air flow is driven by said engine.

5. The engine cooling system as claimed in claim 1, further comprising:
   a second cooling liquid jacket provided about said first cooling liquid jacket to convey a second cooling liquid flow therearound.

6. The engine cooling system as claimed in claim 1, wherein:
   said radiator is of a horizontal flow type.

7. The engine cooling system as claimed in claim 1, further comprising:
   pump means for causing said first cooling liquid to flow between said radiator and said exhaust manifold.

8. The engine cooling system as claimed in claim 7, wherein:
   said pump means for causing said first cooling liquid flow is driven by said engine.

9. The engine cooling system as claimed in claim 1, wherein:
   a hydraulic motor is provided for driving said first means for causing said air to flow.

10. The engine cooling system as claimed in claim 1, wherein:
    said first means for causing said cooling air flow comprises a hydraulic motor driven by said engine.

* * * * *

UNITED STATES PATENT AND TRADEMARK OFFICE
CERTIFICATE OF CORRECTION

PATENT NO. : 4,998,510
DATED : March 12, 1991
INVENTOR(S) : Armond ROGNON

It is certified that error appears in the above-identified patent and that said Letters Patent is hereby corrected as shown below:

Title Page:

Please correct item [76] as follows:

[76] Inventor: Armond Rognon, 18 rue des Suzieres

VERNEUIL-SOUS-COUCY 02380 COUCY LE CHATEAU AUFRIQUE FRANCE

Signed and Sealed this

Thirteenth Day of April, 1993

Attest:

STEPHEN G. KUNIN

*Attesting Officer*  Acting Commissioner of Patents and Trademarks